US012675006B2

(12) United States Patent

Melakari

(10) Patent No.: US 12,675,006 B2

(45) Date of Patent: Jul. 7, 2026

(54) ADAPTIVE LENSES WITH PHOTOVOLTAIC DEVICES

(71) Applicant: Pixieray Oy, Espoo (FI)

(72) Inventor: Klaus Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 467 days.

(21) Appl. No.: 18/061,244

(22) Filed: Dec. 2, 2022

(65) Prior Publication Data

US 2024/0184146 A1 Jun. 6, 2024

(51) Int. Cl.
*G02C 11/00* (2006.01)

(52) U.S. Cl.
CPC .................................... *G02C 11/10* (2013.01)

(58) Field of Classification Search
CPC ..................................................... G02C 11/10
See application file for complete search history.

(56) References Cited

U.S. PATENT DOCUMENTS

| | | | | | |
|---|---|---|---|---|---|
| 5,403,405 | A | * | 4/1995 | Fraas | H02S 10/30 |
| | | | | | 136/253 |
| 7,370,963 | B2 | * | 5/2008 | Cano | G02C 7/101 |
| | | | | | 351/159.6 |
| 11,177,766 | B2 | * | 11/2021 | Xue | H02S 20/26 |
| 11,213,429 | B1 | * | 1/2022 | Li | G02F 1/1337 |
| 11,652,181 | B2 | * | 5/2023 | Lunt | H10F 77/45 |
| | | | | | 257/E31.127 |
| 11,800,728 | B2 | * | 10/2023 | Fusco | H10F 77/45 |
| 12,306,476 | B2 | * | 5/2025 | Righi | G02C 7/101 |
| 2021/0240009 | A1 | * | 8/2021 | Portney | G02C 7/041 |

FOREIGN PATENT DOCUMENTS

KR 20120117409 A * 10/2012

* cited by examiner

*Primary Examiner* — Christopher Stanford

(74) *Attorney, Agent, or Firm* — Ziegler IP Law Group, LLC.

(57) ABSTRACT

An eyewear apparatus includes an adaptive lens per eye; a frame employed to hold the adaptive lens; and at least one photovoltaic device per eye. A photosensitive surface of the at least one photovoltaic device is arranged at a periphery of the adaptive lens. The at least one photovoltaic device is to be employed to convert light incident upon the photosensitive surface into electricity, the electricity being usable to power the adaptive lens.

19 Claims, 3 Drawing Sheets

206

204

300

302B   302D   302F   302H 302A   302C   302E   302G

ADAPTIVE LENSES WITH PHOTOVOLTAIC DEVICES

TECHNICAL FIELD

The present disclosure relates to eyewear apparatuses. Moreover, the present disclosure relates to methods for manufacturing eyewear apparatuses.

BACKGROUND

Nowadays, adaptive lenses are increasingly being used in eyewear apparatuses for providing a smooth viewing experience to users, for correcting vision related problems of users, and the like. The adaptive lenses are capable of adjusting their optical power, as required. This adjustment of the optical power is provided using requisite drive signals.

However, these adaptive lenses need a supply of power in order to function. A set of batteries is a typical way of providing a power supply in existing adaptive lenses. However, once the batteries are discharged, they need to be either replaced or charged. Existing charging mechanisms require a user to take off the eyewear apparatus and put it on charging. Such a charging process is not only time-consuming, but also cumbersome.

Moreover, existing charging mechanisms are challenging to integrate into eyewear apparatuses. A form factor of such charging mechanisms is often bulky and requires considerable space for their arrangement on the eyewear apparatuses. Moreover, a design of such charging mechanisms is often visually unattractive, and thus render the eyewear apparatuses to appear quite ugly. As eyewear apparatuses are often used as a fashion accessory, this is highly undesirable.

Therefore, in light of the foregoing discussion, there exists a need to overcome the aforementioned challenges associated with conventional eyewear apparatuses.

SUMMARY

The present disclosure seeks to provide an eyewear apparatus. Moreover, the present disclosure seeks to provide a method for manufacturing an eyewear apparatus. Furthermore, the present disclosure also seeks to provide a solution to the existing problems of conventional eyewear apparatuses.

In a first aspect, an embodiment of the present disclosure provides an eyewear apparatus comprising:

an adaptive lens per eye;

a frame employed to hold the adaptive lens; and at least one photovoltaic device per eye, wherein a photosensitive surface of the at least one photovoltaic device is arranged at a periphery of the adaptive lens, wherein the at least one photovoltaic device is to be employed to convert light incident upon the photosensitive surface into electricity, the electricity being usable to power the adaptive lens.

In a second aspect, an embodiment of the present disclosure provides a method for manufacturing an eyewear apparatus, the method comprising:

arranging at least one photovoltaic device on an adaptive lens, wherein a photosensitive surface of the at least one photovoltaic device is arranged at a periphery of the adaptive lens;

providing electrical connections between the at least one photovoltaic device and an electronic circuitry of the adaptive lens; and fitting the adaptive lens to a frame.

Embodiments of the present disclosure substantially eliminate, or at least partially address the aforementioned problems in the prior art, and provide the eyewear apparatus having a visually aesthetic appearance in which the at least one photovoltaic device is present in the eyewear apparatus but is arranged in a non-obstructive, visually-pleasing manner. Moreover, using the at least one photovoltaic device, the eyewear apparatus is able to generate sufficient electricity for operation of the adaptive lens.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
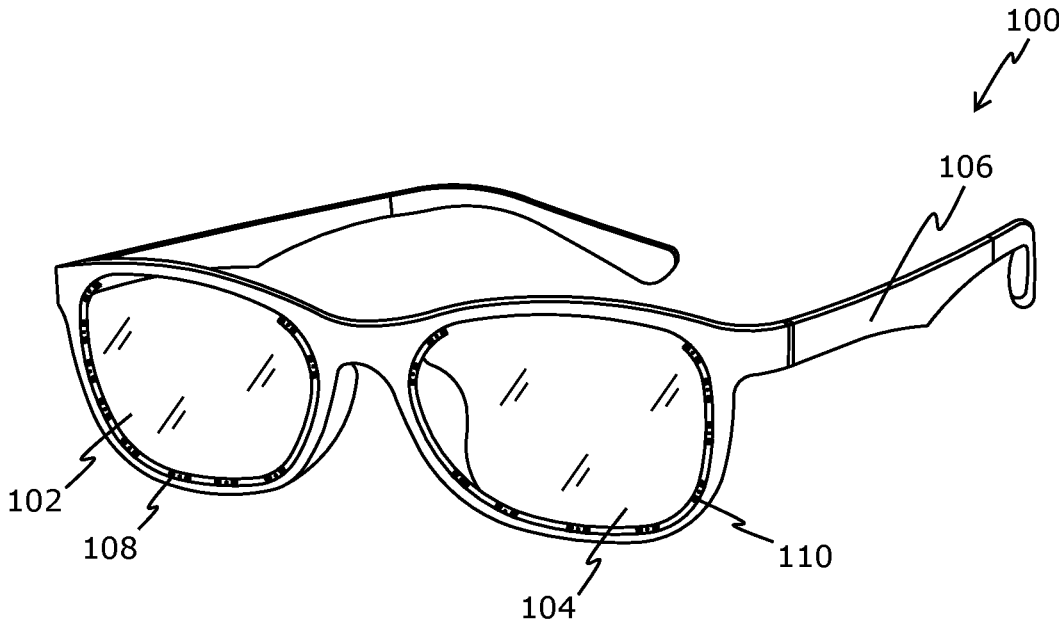
FIG. 1 is a schematic illustration of an eyewear apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify an item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an eyewear apparatus comprising:

an adaptive lens per eye;

a frame employed to hold the adaptive lens; and at least one photovoltaic device per eye, wherein a photosensitive surface of the at least one photovoltaic device is arranged at a periphery of the adaptive lens, wherein the at least one photovoltaic device is to be employed to convert light incident upon the photosensitive surface into electricity, the electricity being usable to power the adaptive lens.

In a second aspect, an embodiment of the present disclosure provides a method for manufacturing an eyewear apparatus, the method comprising:

arranging at least one photovoltaic device on an adaptive lens, wherein a photosensitive surface of the at least one photovoltaic device is arranged at a periphery of the adaptive lens;

providing electrical connections between the at least one photovoltaic device and an electronic circuitry of the adaptive lens; and fitting the adaptive lens to a frame.

Pursuant to embodiments, arranging the at least one photovoltaic device at the periphery of the adaptive lens allows to harvests electricity in an environment-friendly manner, whilst also allowing to design the eyewear apparatus in a visually aesthetic manner. Moreover, the use of the at least one photovoltaic device to power the adaptive lens allows to keep the eyewear apparatus lightweight and compact. Furthermore, using the at least one photovoltaic device ensures that enough electricity is generated in the eyewear apparatus to power the adaptive lens, without the need to manually recharge. Thus, the user is provided with a hassle-free, user-friendly experience, while using the eyewear apparatus that also acts as a fashion accessory for the user.

Moreover, even though the at least one photovoltaic device has a small form factor, it generates enough electricity to power the adaptive lens per eye, whilst making the eyewear apparatus lightweight and compact. Thus, the at least one photovoltaic device is suitable for use in the eyewear apparatus.

Throughout the present disclosure, the term "eyewear apparatus" refers to an apparatus that, in use, is to be worn over eyes of the user. Examples of such an eyewear apparatus include, but are not limited to, a pair of glasses, a pair of sunglasses, smart glasses (for example, such as a pair of extended-reality glasses), and a head-mounted display.

Throughout the present disclosure, the term "adaptive lens" refers to a type of lens that has at least some portion made of an active optical element whose optical power can be changed. In some implementations, the adaptive lens is entirely made up of the active optical element, whereas in other implementations, at least one portion of the adaptive lens is made up of the active optical element and a remaining portion of the adaptive lens is made up of a passive optical element whose optical power is fixed.

In an implementation, the optical power of the adaptive lens for a left eye and a right eye is controlled separately as per the requirements of the user. For example, out of the two eyes, the user may have a dominant eye (i.e., an eye having a better vision over other eye, or the eye that is used more for viewing over the other eye), thus, the optical power of the adaptive lens for both the eyes can be adjusted accordingly.

Throughout the present disclosure, the term "frame" refers to a supporting structure for holding the adaptive lens with respect to the user's eyes. The frame securely holds the adaptive lens using a suitable mechanical connection (for example, such as a snap fit connection, or similar) along the periphery of the adaptive lens. Optionally, the frame is mechanically connected with the adaptive lens along an entirety of the periphery of the adaptive lens. Alternatively, optionally, the frame is mechanically connected with the adaptive lens along a portion (for example, a top portion) of the periphery of the adaptive lens. The frame may be, for example, made of a material, such as plastic, a metal, an alloy, and the like.

Throughout the present disclosure, the term "photovoltaic device" refers to a device that converts the light incident thereupon, into electricity. The light incident upon the photosensitive surface of the at least one photovoltaic device could emanate from natural sources (for example, the sun) and/or could emanate from artificial light sources (for example, lamps, tube lights, and similar). It will be appreciated that for changing the optical power of the adaptive lens, the adaptive lens needs to be supplied with the electricity. The electricity that is generated by the at least one photovoltaic device is either directly supplied to the adaptive lens or is stored, for example, in a battery arranged in the eyewear apparatus, and accordingly the electricity is supplied to the adaptive lens by the battery as required.

Optionally, the at least one photovoltaic device comprises a plurality of photodiodes. The photodiodes convert the energy of light incident thereupon directly into electricity by the photovoltaic effect. The photodiodes may be made up of silicon, germanium, indium gallium arsenide, mercury cadmium telluride, and the like.

Herein, the term "photosensitive surface" refers to a surface of the photovoltaic device that is adapted to sense the light, which is incident thereupon, thus enabling the at least one photovoltaic device to generate the electricity according to an intensity of the light. In particular, electrons in the at least one photovoltaic device absorb energy from the light incident upon the photosensitive surface, and move within the at least one photovoltaic device to create a potential difference which causes a flow of electrons in a circuit connected to the at least one photovoltaic device.

The photosensitive surface is arranged at the periphery of the adaptive lens. The periphery of the adaptive lens is able to receive the light present in a real-world environment in which the eyewear apparatus is in use either directly and/or via other elements of the eyewear apparatus.

Herein, the term "periphery" of the adaptive lens refers to an area in proximity of an edge of the adaptive lens. Notably, arranging the photosensitive surface at the periphery of the adaptive lens allows the at least one photovoltaic device to receive sufficient light thereon, without adversely impacting a viewing experience of the user (who is viewing through the adaptive lens) and an aesthetic quality of the eyewear apparatus.

Optionally, the periphery of the adaptive lens is present on at least one of:

a world-facing surface of the adaptive lens, a user-facing surface of the adaptive lens, a curved surface.

In this regard, the term "user-facing surface" refers to a surface on the adaptive lens that lies directly in front of the eyes of the user, when the eyewear apparatus is in use. The term "world-facing surface" refers to a surface of the adaptive lens that lies opposite to the user-facing surface. The term "curved surface" refers to a surface of the adaptive lens between the world-facing surface and the user-facing surface. The curved surface is a surface that is in contact with the frame when the adaptive lens is fit inside the frame.

When the photosensitive surface of the at least one photovoltaic device is arranged on the curved surface, the at least one photovoltaic device is sandwiched between the frame and the adaptive lens, thereby lying hidden. Thus, the design of the eyewear apparatus is aesthetically pleasant and allows seamless viewing by the user.

When the photosensitive surface of the at least one photovoltaic device is arranged on the world-facing surface and/or the user-facing surface, the photosensitive surface could be made very thin, such that it is not readily visible.

It will be appreciated that the electricity is used to power the adaptive lens, which allows a given optical power to be produced at: at least a portion of the adaptive lens. For example, the given optical power could be a zero optical power, a negative optical power, a positive optical power. When different portions of the adaptive lens are controlled using the electricity to have different optical powers, the adaptive lens can be understood to have a spatially-variable optical power.

Optionally, the photosensitive surface of the at least one photovoltaic device lies along an entirety of the periphery of the adaptive lens. In such a case, the at least one photovoltaic device covers a largest surface area around the periphery of the adaptive lens, thereby generating a maximum amount of electricity.

Alternatively, optionally, the photosensitive surface of the at least one photovoltaic device lies along a portion of the periphery of the adaptive lens. In this regard, the portion of the periphery may be one that is uncovered by the frame.

Moreover, optionally, the adaptive lens comprises a plurality of nanoparticles that are to be employed to direct a portion of the light incident thereupon towards the photosensitive surface of the at least one photovoltaic device. Herein, the term "nanoparticles" refers to particles that are nano-sized. Optionally, the plurality of nanoparticles have a diameter lying in range of 1 nanometer (nm) to 100 nm. More optionally, the plurality of nanoparticles have a diameter lying in range of 10 nm to 50 nm. Hence, the plurality of nanoparticles are suitable to be arranged inside or outside the adaptive lens. Moreover, the plurality of nanoparticles have a tendency to change a path of the portion of the light incident thereupon. Thus, the plurality of nanoparticles are arranged with respect to the adaptive lens such that the plurality of nanoparticles can direct the portion of light that is incident thereupon towards the photosensitive surface. This allows the photosensitive surface to efficiently receive and harness the portion of the light even if it is not directly exposed to said light. Furthermore, an amount of electricity generated by the at least one photovoltaic device when the plurality of nanoparticles are employed is higher than an amount of electricity generated by the at least one photovoltaic device without employing the plurality of nanoparticles.

Optionally, the plurality of nanoparticles are made of at least one of: polymethyl methacrylate (PMMA), polycarbonate (PC), polystyrol (PS), cyclo olefin polymer (COP) and/or cyclo olefin-copolymer (COC). Optionally, the plurality of nanoparticles are implemented as quantum dots. For example, the plurality of nanoparticles may comprise copper indium sulphide encased in zinc sulphide. It will be appreciated that all feasible materials of nanoparticles that enable the embodiments described herein are well within the scope of the present disclosure.

Optionally, the plurality of nanoparticles are dispersed in a substrate of the adaptive lens. Optionally, in this regard, the substrate of the adaptive lens is made from one of: glass, a polymer, a polycarbonate, a plastic. When the plurality of nanoparticles are dispersed in the substrate of the adaptive lens, they are spread over a considerable area of the adaptive lens, and thus enable in harnessing a substantial amount of light from the real-world environment in which the eyewear apparatus is in use.

Optionally, the plurality of nanoparticles are dispersed in a coating formed on the substrate of the adaptive lens. Herein, the material of the coating is such that the view of the adaptive lens is not obstructed by the presence of the coating on the substrate of the adaptive lens. Moreover, the coating is easy to apply on the substrate of the adaptive lens, and thus simplifies manufacturing process of forming the coating on the substrate of the adaptive lens. Notably, the coating may be formed only on a selective region of the substrate of the adaptive lens. Furthermore, depending upon the thickness of the coating that is used, the number of nanoparticles that are used can also be controlled. Furthermore, the coating including the plurality of nanoparticles may be antistatic, self-cleaning, and water repellent, thus, being beneficially used for achieving such effects in the adaptive lens.

Optionally, the portion of the light that is to be directed by the plurality of nanoparticles towards the photosensitive surface is at least one of: infrared light, ultraviolet light. It will be appreciated that the light that is incident upon the adaptive lens has different portions having different ranges of wavelengths. For example, the light may have at least three portions—visible light, the infrared light and the ultraviolet light. The at least one of: the infrared light (i.e., the portion of light that has wavelengths lying in infrared spectrum), the ultraviolet light (i.e., the portion of light that is having wavelength in ultraviolet range) from amongst all the different portions of the light is directed by the plurality of nanoparticles towards the photosensitive surface. Thus, the plurality of nanoparticles allow efficient harnessing of light belonging to non-visible parts of the electromagnetic spectrum.

Notably, the capability of the nanoparticles to direct light depends on their size and the wavelength of the light. Optionally, in this regard, the size of the plurality of nanoparticles is selected such that at least one of: the infrared light, the ultraviolet light, is directed towards the photosensitive surface of the at least one photovoltaic device. In such a case, the visible light passes through the adaptive lens without being directed towards the photosensitive surface. As a result, the adaptive lens is fully transparent to the visible light.

Optionally, the photosensitive surface of the at least one photovoltaic device has a bandpass filter provided thereon that is to be employed to allow only a given spectral band to pass therethrough. In this regard, allowing only the given spectral band to pass through to the photosensitive surface enables the at least one photovoltaic device to achieve a better signal to noise ratio, as all the unwanted spectral bands are blocked by the bandpass filter. In other words, the bandpass filter may be provided to reduce noise from an environment in which the eyewear apparatus is used. Herein, the term "given spectral band" refers to a range of wavelengths lying in a portion of the electromagnetic spectrum. Optionally, a width of the given spectral band lies in a range of 50-100 nm. This means that only a narrow range of wavelengths are allowed to pass through the band pass filter. Optionally, when the photodiodes of the photovoltaic device are to be employed for gaze tracking using infrared light, the given spectral band is selected to allow wavelengths corresponding to the infrared light. Herein, the band pass filter is a light filter, which may be provided (i.e., arranged) in the form of a coating on the photosensitive surface of the photovoltaic device. In an example, the bandpass filter may be configured to allow only light belonging to a spectral band of 900 nm to 980 nm to pass therethrough. In such an example, a wavelength of 940 nm may be used for gaze tracking. In another example, the bandpass filter may be configured to allow only light belonging to a spectral band of 1320 nm to 1370 nm to pass therethrough, when a wavelength of 1350 nm is required for gaze tracking. In yet another example, the bandpass filter may be configured to allow only light belonging to a spectral band of 300 nm to 350 nm to pass therethrough, when an ultraviolet wavelength is required.

Furthermore, optionally, the eyewear apparatus further comprises:

a plurality of light sensors that are to be employed to sense reflections of light off a surface of a user's eye, the plurality of light sensors being arranged along a portion of the periphery of the adaptive lens; and a processor configured to:

process sensor data pertaining to the sensed reflections to determine a gaze direction of the user's eye; and generate a drive signal to control an optical power of the adaptive lens, based on the gaze direction.

In this regard, sensing of the reflections of light off the surface of the user's eyes and processing of the sensor data is performed to determine the gaze direction of the user's eye (i.e., a direction in which the user is looking). Herein, the light that is reflected off the surface of the user's eyes may be ambient lighting (i.e., light from surroundings of the user) and/or dedicated light beams directed towards the user's eye for the aforesaid purpose of gaze tracking.

Optionally, a given light sensor is implemented as at least one of: an IR light sensor, a visible light sensor, a UV light sensor. Moreover, when the at least one photovoltaic device comprises the plurality of photodiodes, the same photodiodes can be employed for light sensing (namely, as the plurality of light sensors) in addition to harnessing electromagnetic radiation for generating electricity.

Optionally, the processor controls an overall operation of gaze tracking and controlling the adaptive lens based on such gaze tracking. The processor processes the sensor data using suitable data processing algorithms. Optionally, the processor is configured to determine a given optical power to be produced in at least a portion of the adaptive lens to provide a near perfect vision to the user, based on gaze directions of the eyes of the user. Optionally, in this regard, the processor is configured to determine, based on the gaze directions, a given optical depth at which the user is gazing; and select an optical power prescribed for a given eye of the user corresponding to the given optical depth. Optionally, the processor is configured to select the portion of the adaptive lens in which the given optical power is to be produced, based on the gaze direction of the given eye. Thus, the processor accordingly generates the drive signal to control the optical power of the adaptive lens. Optionally, the processor is also configured to control the working of the plurality of light sensors.

Notably, for sensing the reflections of light, the plurality of light sensors are arranged along the portion of the periphery of the adaptive lens. The arrangement of the plurality of light sensors with respect to the at least one photovoltaic device is described as follows.

In an implementation, the plurality of light sensors and the photosensitive surface are arranged on different portions of the periphery of the adaptive lens. For example, the plurality of light sensors may be arranged on a peripheral area of the user-facing surface of the adaptive lens, whereas the photosensitive surface may be arranged on the curved surface of the adaptive lens.

In another implementation, the plurality of light sensors and the photosensitive surface are arranged on a same portion of the periphery of the adaptive lens. In an example, the plurality of light sensors and the photosensitive surface may be arranged on the curved surface of the adaptive lens. In another example, the plurality of light sensors and the photosensitive surface may be arranged on a peripheral area of the world-facing surface of the adaptive lens. In yet another example, the plurality of light sensors and the photosensitive surface may be arranged on the peripheral area of the user-facing surface of the adaptive lens. In the another implementation, the plurality of light sensors may be arranged to partially or completely overlap with the photosensitive surface. Optionally, in this regard, the plurality of light sensors may be first arranged on the substrate at the periphery of the adaptive lens, and then the photosensitive surface of the at least one photovoltaic device may be arranged over the plurality of light sensors.

Optionally, the eyewear apparatus further comprises at least one light source, arranged on the periphery of the adaptive lens, that is to be employed to emit light towards the user's eye. In this regard, the light that is required to be directed towards the user's eye for the gaze tracking, is emitted via the at least one light source. Examples of the at least one light source include, but are not limited to, a light-emitting diode (LED), and a laser. The laser may be a vertical-cavity surface-emitting laser (VCSEL), an edge-emitting laser (EEL), and the like. Optionally, the light emitted by the at least one light source is at least one of: infrared light, visible light, ultraviolet light. Optionally, the processor is configured to control the working of the at least one light source. The at least one light source emits dedicated light beams that are directed towards the user's eye for the aforesaid purpose of gaze tracking, thereby enabling in accurately tracking of the gaze directions of the user's eyes.

The present disclosure also relates to the method of the second aspect as described above. Various embodiments and variants disclosed above, with respect to the aforementioned first aspect, apply mutatis mutandis to the method.

The at least one photovoltaic device is arranged on the adaptive lens manually and/or via a machine or a tool. When multiple photovoltaic devices are arranged on the adaptive lens, their photosensitive surfaces are arranged in a non-overlapping manner.

Throughout the present disclosure, the term "electronic circuitry" refers to electronic components of the adaptive lens that are responsible for the working of the adaptive lens. For example, the electronic circuitry comprises electrodes of the adaptive lens, feedlines connected to the electrodes, and optionally, the processor. The electrodes of the adaptive lens are optionally optically transparent. The electrodes may be deposited as a single layer or unconnected segments on a given substrate of the adaptive lens. The electrodes may, for example, be made of indium tin oxide (ITO) or doped zinc oxide (ZnO), where ZnO is doped with aluminium or hydrogen. Alternatively, the electrodes may be made of a conductive polymer or graphene.

Throughout the present disclosure, the term "electrical connections" refers to electrical wiring configurations present in the eyewear apparatus that provide electricity to the adaptive lens either directly from the at least one photovoltaic device or from a battery connected to the at least one photovoltaic device. The electrical connections may be provided via deposition of an electrically conductive material connecting the electrodes of the adaptive lens and the at least one photovoltaic device, providing wire connections between the adaptive lens and the at least one photovoltaic device.

The adaptive lens is fitted to the frame manually and/or via a machine or a tool. The adaptive lens is fitted securely to the frame, and may optionally be removably fitted to the frame. The adaptive lens may be removed from the frame, for example, in case of damage to the adaptive lens, damage to the frame, cleaning of the adaptive lens, fitting of a new adaptive lens, or similar.

Optionally, in the method, the photosensitive surface of the at least one photovoltaic device is arranged to lie along an entirety of the periphery of the adaptive lens.

Optionally, the method further comprises providing a plurality of nanoparticles in the adaptive lens, wherein the plurality of nanoparticles are to be employed to direct a portion of light incident thereupon towards the photosensitive surface of the at least one photovoltaic device.

Optionally, in the method, the step of providing the plurality of nanoparticles in the adaptive lens comprises using a substrate in which the plurality of nanoparticles are dispersed, to form the adaptive lens.

Optionally, in the method, the step of providing the plurality of nanoparticles in the adaptive lens comprises applying on a substrate of the adaptive lens a coating of a material in which the plurality of nanoparticles are dispersed.

Optionally, in the method, the portion of the light that is to be directed by the plurality of nanoparticles towards the photosensitive surface is at least one of: infrared light, ultraviolet light.

Optionally, the method further comprises providing a bandpass filter on the photosensitive surface of the at least one photovoltaic device, wherein the bandpass filter allows only a given spectral band to pass therethrough.

Optionally, the method further comprises:

arranging a plurality of light sensors along a portion of the periphery of the adaptive lens, wherein the plurality of light sensors are to be employed to sense reflections of light off a surface of a user's eye;

configuring a processor to:

process sensor data pertaining to the sensed reflections to determine a gaze direction of the user's eye; and generate a drive signal to control an optical power of the adaptive lens, based on the gaze direction; and providing electrical connections between the at least one photovoltaic device and the plurality of light sensors, and between the at least one photovoltaic device and the processor.

Optionally, the method further comprises:

arranging at least one light source on the periphery of the adaptive lens, wherein the at least one light source is to be employed to emit light towards the user's eye; and providing electrical connections between the at least one photovoltaic device and the at least one light source.

Optionally, in the method, the at least one photovoltaic device is in a form of a band, and the step of arranging the at least one photovoltaic device on the adaptive lens comprises wrapping the band of the at least one photovoltaic device around the curved surface of the adaptive lens that lies between the world-facing surface and the user-facing surface of the adaptive lens. In this regard, an entirety of the curved surface of the adaptive lens can be used to incorporate the band of the at least one photovoltaic device in the eyewear apparatus, thus providing a hassle-free and easy way for arranging the at least one photovoltaic device on the adaptive lens.

DETAILED DESCRIPTION OF THE DRAWINGS

Referring to FIG. 1, illustrated is a schematic illustration of an eyewear apparatus 100, in accordance with an embodiment of the present disclosure. The eyewear apparatus 100 comprises an adaptive lens per eye (depicted as adaptive lenses 102 and 104), a frame 106 employed to hold the adaptive lenses 102 and 104, and at least one photovoltaic device per eye (depicted as photovoltaic devices 108 and 110).

Figure 2A:
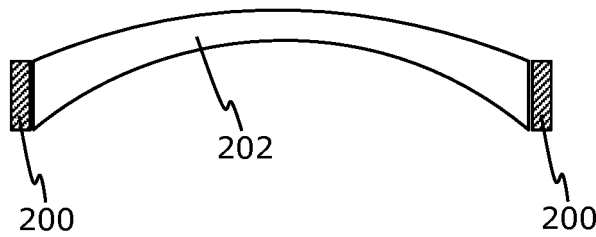
FIG. 2A is a cross-sectional view of an arrangement of at least one photovoltaic device with an adaptive lens, in accordance with an embodiment of the present disclosure.

Referring next to FIG. 2A, illustrated is a cross-sectional view of an arrangement of at least one photovoltaic device (depicted as a photovoltaic device 200) on an adaptive lens 202, in accordance with an embodiment of the present disclosure. The photovoltaic device 200 is shown to be arranged at a periphery of the adaptive lens 202. Herein, the photovoltaic device 200 is arranged, for example, at a curved surface of the adaptive lens 202.

Figure 2B:
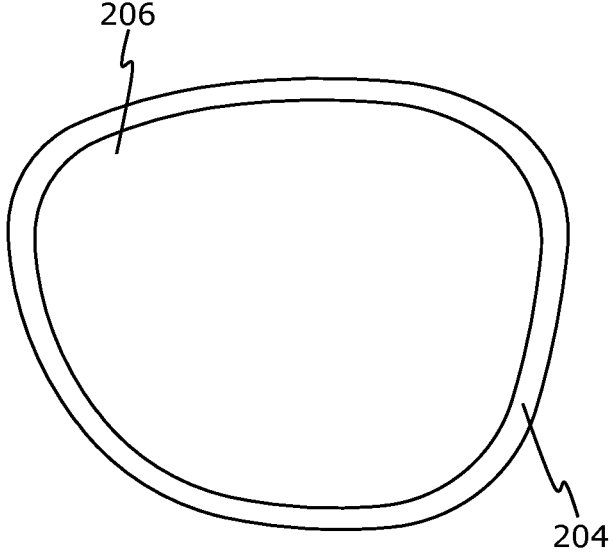
FIG. 2B is a two-dimensional view of an arrangement of at least one photovoltaic device with an adaptive lens, in accordance with another embodiment of the present disclosure.

Referring to FIG. 2B, illustrated is a two-dimensional view of an arrangement of at least one photovoltaic device (depicted as a photovoltaic device 204) on an adaptive lens 206, in accordance with another embodiment of the present disclosure. The photovoltaic device 204 is shown to be arranged at an entirety of a periphery of the adaptive lens 206. In such a case, the photovoltaic device 204 could be arranged on a periphery of a world-facing surface or a user-facing surface of the adaptive lens 206.

FIGS. 2A and 2B are merely examples, which should not unduly limit the scope of the claims herein. A person skilled in the art will recognize many variations, alternatives, and modifications of embodiments of the present disclosure. For example, the photovoltaic device 204 could lie along only a portion of the periphery of the adaptive lens 206.

Figure 3:
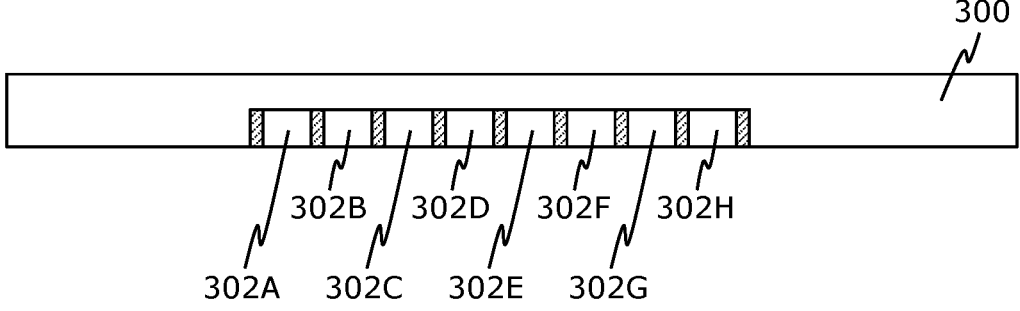
FIG. 3 is a schematic illustration of an arrangement of a photosensitive surface of at least one photovoltaic device with respect to a plurality of light sensors, in accordance with an embodiment of the present disclosure.

Referring next to FIG. 3, illustrated is a cross-sectional view of a part of a periphery of an adaptive lens on which a photosensitive surface 300 of at least one photovoltaic device (not shown) and a plurality of light sensors 302A-H are arranged, in accordance with an embodiment of the present disclosure. There is shown an overlap between the photosensitive surface 300 and the plurality of light sensors 302A-H, wherein in an overlapping region of their arrangement, the photosensitive surface 300 lies on top of the plurality of light sensors 302A-H.

FIG. 3 is merely an example, which should not unduly limit the scope of the claims herein. A person skilled in the art will recognize many variations, alternatives, and modifications of embodiments of the present disclosure.

Figure 4:
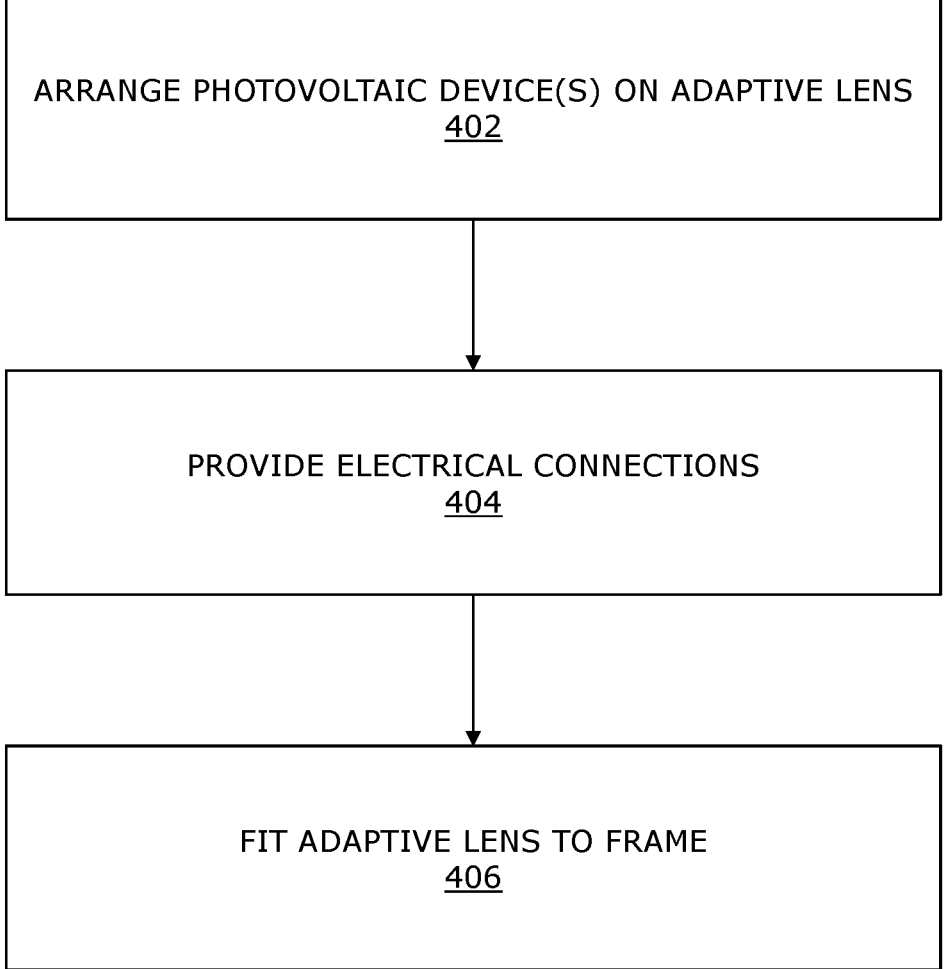
FIG. 4 illustrates steps of a method for manufacturing an eyewear apparatus, in accordance with an embodiment of the present disclosure.

Referring to FIG. 4, illustrated are steps of a method for manufacturing an eyewear apparatus, in accordance with an embodiment of the present disclosure. At step 402, at least one photovoltaic device is arranged on an adaptive lens, wherein a photosensitive surface of the at least one photovoltaic device is arranged at a periphery of the adaptive lens. At step 404, electrical connections between the at least one photovoltaic device and an electronic circuitry of the adaptive lens are provided. At step 406, the adaptive lens is fitted to a frame.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

The invention claimed is:

1. An eyewear apparatus comprising:
a pair of adaptive lenses, each adaptive lens of the pair of adaptive lenses comprising a first surface and a second surface opposite the first surface, a peripheral edge surface disposed between the first surface and the second surface surrounding each adaptive lens;
a frame configured to hold the pair of adaptive lenses;
at least one photovoltaic device per adaptive lens of the pair of adaptive lenses, wherein each of the at least one photvoltaic device is a band and the band of the respective photvoltaic device is disposed around an entirety of the peripheral edge surface of a respective adaptive lens, wherein each of the at least one photo-voltaic device is radially sandwiched between the frame and the outer peripheral surface each photovol-taic device being configured to convert light incident upon a respective photosensitive surface of the respec-tive photovoltaic device into electricity usable to power the respective adaptive lens.

2. The eyewear apparatus of claim 1, wherein the photo-sensitive surfaces of the at least one photovoltaic device lie along an entirety of the periphery of the respective adaptive lens.

3. The eyewear apparatus of claim 1, wherein the respec-tive adaptive lens comprises a plurality of nanoparticles that are to be employed to direct a portion of the light incident thereupon towards the photosensitive surfaces of the at least one photovoltaic device.

4. The eyewear apparatus of claim 3, wherein the plurality of nanoparticles are dispersed in a substrate of the respective adaptive lens.

5. The eyewear apparatus of claim 3, wherein the plurality of nanoparticles are dispersed in a coating formed on a substrate of the respective adaptive lens.

6. The eyewear apparatus of claim 3, wherein the portion of the light that is to be directed by the plurality of nanoparticles towards the photosensitive surfaces is at least one of: infrared light, ultraviolet light.

7. The eyewear apparatus of claim 1, wherein the photo-sensitive surfaces of the at least one photovoltaic device has a bandpass filter provided thereon that is to be employed to allow only a given spectral band to pass therethrough.

8. The eyewear apparatus of claim 1, further comprising:
a plurality of light sensors configured to sense reflections of light off a surface of a user's eye, the plurality of light sensors being arranged along a portion of the periphery of the respective adaptive lens; and
a processor configured to:
process sensor data pertaining to the sensed reflections to determine a gaze direction of the user's eye; and
generate a drive signal to control an optical power of the adaptive lens, based on the gaze direction.

9. The eyewear apparatus of claim 8, further comprising at least one light source, arranged on the periphery of the respective adaptive lens, that is configured to emit light towards the user's eye.

10. A method for manufacturing an eyewear apparatus, the method comprising:
arranging at least one photovoltaic device on a respective adaptive lens of a pair of adaptive lenses configured to be held in a frame, each adaptive lens of the pair of adaptive lenses comprising a first surface and a second surface opposite the first surface, a peripheral edge surface disposed between the first surface and the second surface surrounding each adaptive lens, wherein each of the at least one photvoltaic device is a band and the band of the respective photvoltaic device is dis-posed around an entirety of the peripheral edge surface of a respective adaptive lens;
providing electrical connections between the at least one photovoltaic device and an electronic circuitry of the respective adaptive lens; and fitting the respective adaptive lens to the frame, wherein the at least one photovoltaic device is radially sandwiched between the frame and the outer peripheral surface.

11. The method of claim 10, wherein a photosensitive surface of the at least one photovoltaic device is configured to lie along an entirety of the periphery of the respective adaptive lens.

12. The method of claim 10, further comprising providing a plurality of nanoparticles in the respective adaptive lens, wherein the plurality of nanoparticles are to be employed to direct a portion of light incident thereupon towards the photosensitive surface of the at least one photovoltaic device.

13. The method of claim 12, wherein the step of providing the plurality of nanoparticles in the respective adaptive lens comprises using a substrate in which the plurality of nan-oparticles are dispersed, to form the respective adaptive lens.

14. The method of claim 12, wherein the step of providing the plurality of nanoparticles in the respective adaptive lens comprises applying on a substrate of the respective adaptive lens a coating of a material in which the plurality of nanoparticles are dispersed.

15. The method of claim 12, wherein the portion of the light that is to be directed by the plurality of nanoparticles towards the photosensitive surface is at least one of: infrared light, ultraviolet light.

16. The method of claim 10, further comprising providing a bandpass filter on the photosensitive surface of the at least one photovoltaic device, wherein the bandpass filter allows only a given spectral band to pass therethrough.

17. The method of claim 10, further comprising:
arranging a plurality of light sensors along a portion of the periphery of the respective adaptive lens, wherein the plurality of light sensors are configured to be employed to sense reflections of light off a surface of a user's eye; and
configuring a processor to:
process sensor data pertaining to the sensed reflections to determine a gaze direction of the user's eye; and
generate a drive signal to control an optical power of the respective adaptive lens, based on the gaze direction; and
providing electrical connections between the at least one photovoltaic device and the plurality of light sensors, and between the at least one photovoltaic device and the processor.

18. The method of claim 17, further comprising:

arranging at least one light source on the periphery of the respective adaptive lens, wherein the at least one light source is to be employed to emit light towards the user's eye; and providing electrical connections between the at least one photovoltaic device and the at least one light source.

19. The method of claim 10, wherein the at least one photovoltaic device is in a form of a band, and wherein the step of arranging the at least one photovoltaic device on the respective adaptive lens comprises wrapping the band of the at least one photovoltaic device around a curved surface of the respective adaptive lens that lies between a world-facing surface and a user-facing surface of the respective adaptive lens.

\*    \*    \*    \*    \*